United States Patent [19]

Kurata et al.

[11] Patent Number: 4,530,681
[45] Date of Patent: Jul. 23, 1985

[54] CHAIN TENSIONER

[75] Inventors: Noboru Kurata; Toshifumi Ito, both of Saitama, Japan

[73] Assignee: Honda Giken Kogyo Kabushiki Kaisha, Tokyo, Japan

[21] Appl. No.: 550,235

[22] Filed: Nov. 8, 1983

[30] Foreign Application Priority Data

Nov. 8, 1982 [JP] Japan ............................. 57-195637

[51] Int. Cl.³ ............................................. F16H 7/08
[52] U.S. Cl. .................................... 474/111; 474/140
[58] Field of Search ............... 474/111, 140, 133, 135

[56] References Cited

U.S. PATENT DOCUMENTS 2,261,316 11/1941 Weller ................................. 474/111
3,463,025 8/1969 Turner et al. ....................... 474/111

FOREIGN PATENT DOCUMENTS 310243 4/1929 United Kingdom ................ 474/111

Primary Examiner—James A. Leppink
Assistant Examiner—Frank H. McKenzie, Jr.
Attorney, Agent, or Firm—Lyon & Lyon

[57] ABSTRACT

A motorcycle engine having a tensioning mechanism for a cam chain. The mechanism includes a guide on the slack side of the chain which is controlled by two spaced pivotally-mounted links. One of the two links is biased by a spring to tension the cam chain. A sliding rod mechanism prevents facile motion of the links to lessen tension in the cam chain while allowing free tightening. The links are of such proportional extent that the end of the guide nearest the driving sprocket provides the tensioning motion while the end of the guide adjacent the driven sprocket remains tangent thereto.

4 Claims, 3 Drawing Figures

CHAIN TENSIONER

BACKGROUND OF THE INVENTION

The field of the present invention is tensioning mechanisms for chain drives.

Four-cycle overhead cam engines of moderate construction require timing belts or chains for transmitting power and accurate positioning of the crankshaft to the camshafts. With modern high speed engines, and particularly motorcycle engines, it is advantageous to have a chain tensioner which can prevent the flopping of the chain and at the same time accommodate the high speeds encountered in such engines.

Conventional chain tensioning systems have either employed a guide that is simply connected to a spring at the loose side of the chain. Alternately, lever type guides have been employed which are free to pivot at a first end as may be biased by a spring. Such tensioners have generally been fixed outside of the chain and, therefore, take up substantial space not available particularly on motorcycles.

SUMMARY OF THE INVENTION

The present invention is directed to a chain tensioner which is both compact and able to provide smooth movement to prevent flopping. The guide is mounted with two links pivotally mounted inwardly of the chain and extending in proportional extent such that one end of the guide provides a tensioning of the chain while the other end of the guide remains substantially tangential to the adjacent, driven sprocket.

Accordingly, it is an object of the present invention to provide an improved chain tensioner. Other and further objects and advantages will appear hereinafter.

DETAILED DESCRIPTION OF THE PREFERRED EMBODIMENTS

Figure 1:
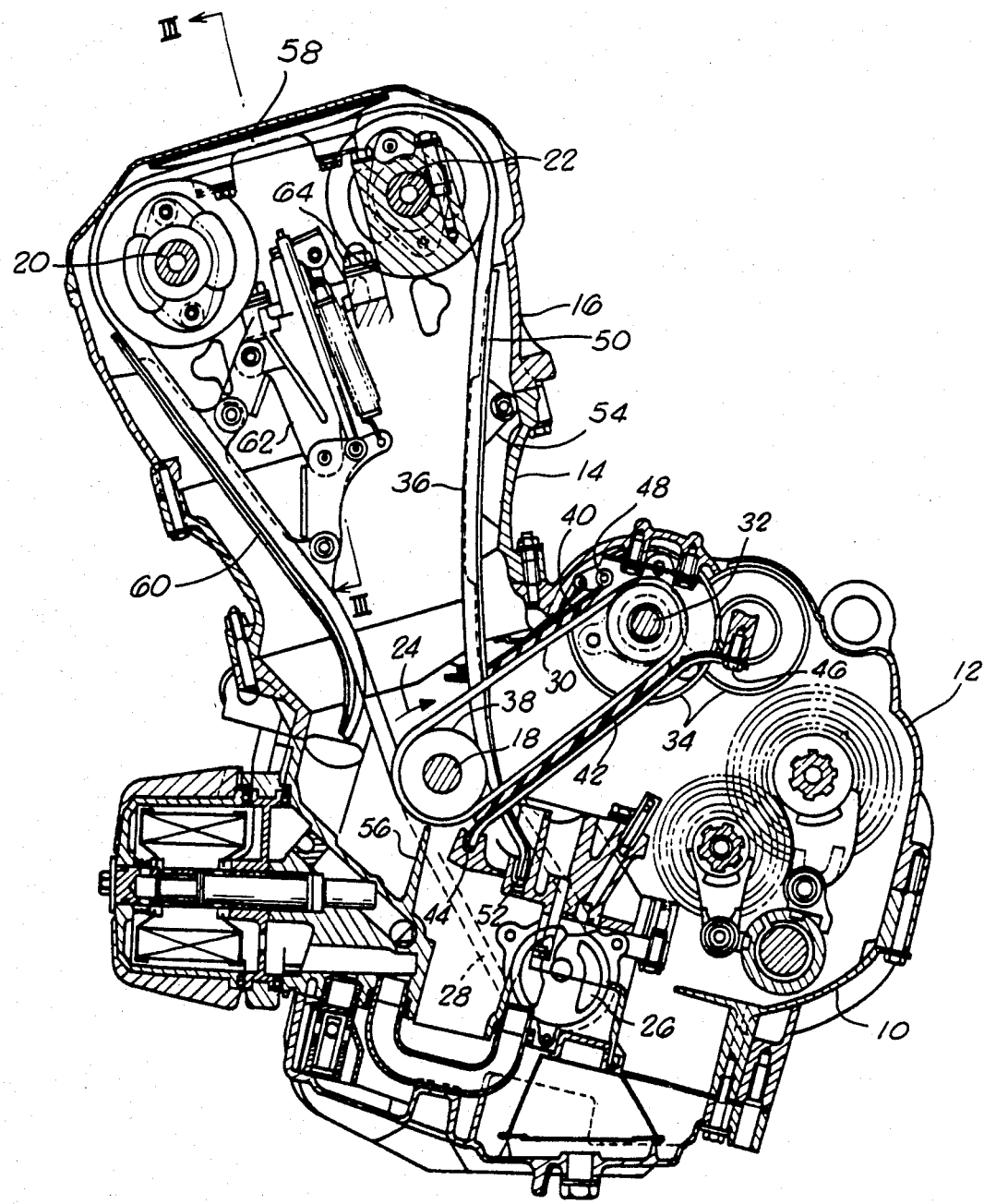
FIG. 1 is a cross-sectional end view of an engine illustrating a timing chain mechanism of the present invention.

Turning in detail to the drawings and particularly FIG. 1, an engine is illustrated as including a lower engine case 10, an upper engine case 12, a cylinder head 14 and a cylinder cover 16. Each of the components of the engine structure are bolted together as can be seen in FIG. 1. The engine also includes a crankshaft 18, an exhaust camshaft 20 and an intake camshaft 22. The direction of drive of the crankshaft 18 is illustrated by an arrow 24.

Driven off of the crankshaft 18 is an oil pump 26 coupled with the crankshaft 18 by means of a chain 28. Also coupled with the crankshaft 18 is the starter chain 30. A generator shaft 32 and gearing 34 for the motor are associated with the chain 30. Sprocket wheels on the crankshaft 18 engage the chains 28 and 30.

A timing chain or cam chain 36 is also driven by the crankshaft 18 about a sprocket 38. As the crankshaft 18 rotates clockwise as seen by arrow 24, the chain 36 is in a tensioned condition extending between the sprocketed camshafts 20 and 22 and between the camshaft 22 and the crankshaft 18. The slack portion of the cam chain is the portion extending from the crankshaft 18 upwardly to the camshaft 20.

Guides are provided with the several chains to insure proper operation thereof. Chain guides 40 and 42 surround the starter chain 30. The guide 42 is fixed in a U-shaped slot 44 to the lower engine case 10 and bolted to the upper engine case 12 at 46. The guide 40 is preferably spring loaded about a pivot 48 to maintain tension within the chain 30. A cam chain guide 50 is placed on the incoming side of the cam chain 36. This guide 50 is fixed in a U-shaped supporting member 52 of the lower engine case 10 and by means of bracket 54. A fixed guide 56 extends from the lower engine case 10 to adjacent the crankshaft 18 to prevent the chain or chains from coming off the related sprockets. A cam chain guide 58 is fixed to the cylinder cover 16 to guide the cam chain 36 between the exhaust camshaft 20 and the intake camshaft 22.

A tensioning cam chain guide 60 is positioned on the slack side of the cam chain between the crankshaft 18 and the exhaust camshaft 20. The guide 60 extends from near the crankshaft 18 to near the exhaust camshaft 20. The end most adjacent the crankshaft 18 is curved to allow for substantial tensioning displacement as can be seen in phantom in FIG. 2. This guide 60 is made out of metal for rigidity and includes synthetic material as a coating on the surface adjacent the cam chain 36. The synthetic material is selected from those which exhibit high wear resistant properties and lower friction characteristics.

The guide 60 is mounted interior to the cam chain 36. This reduces the profile of the cam chain system to reduce overall engine size. This is of substantial importance in motorcycle engines. A fixed bracket 62 is mounted to portions of the cylinder body 14 by means of fasteners 64. The fixed bracket 62 is defined as two plates generally spaced in a parallel manner by a spacer 66. Pinned to the fixed bracket 62 are first and second links 68 and 70. Link 68 is pivoted about a pin 72 extending between parallel portions of the fixed bracket 62. The second link 70 is pivotally mounted about a pin 74 also fixed between portions of the fixed bracket 62. The first and second links 68 and 70 are also pinned to the guide 60 at brackets 76 and 78. Again, pins 80 and 82 associate the links 68 and 70 with the guide 60.

The second link 70 is not constrained from pivotal motion. However, the first link 68 is biased by a spring 84 hooked to the link 68 at attachment point 86. With the spring 84 in tension, it can be seen that the link 68 tends to rotate counterclockwise about the fixed pin 72 so as to draw the pin 80 inwardly and in turn the guide 60 inwardly to tension the chain 36. The spring 84 is affixed to a pivotally mounted bracket 88 mounted about a pin 90 also fixed to the fixed bracket 62. An attachment point 92 retains the spring 84 in the appropriate tensioned condition.

The pivotally mounted bracket 88 is free to pivot under the influence of the spring 84. A small hole is provided through the bracket 88 for receipt of a rod link 94. The rod link 94 is pinned by means of a pin 96 to the first link 68. The relative size of the hole 98 through the rod link 94 causes binding of the rod 94 in the bracket 88.

The binding of the rod 94 in the bracket 88 is designed to operate in one direction only. The rod 94 may slide freely upwardly through the bracket 88. However, retraction is restricted because of the pivoting of the bracket 88 to bind the rod 94. In this way, the guide 60 cannot be easily drawn outwardly by motion of the cam chain 36.

Figure 2:
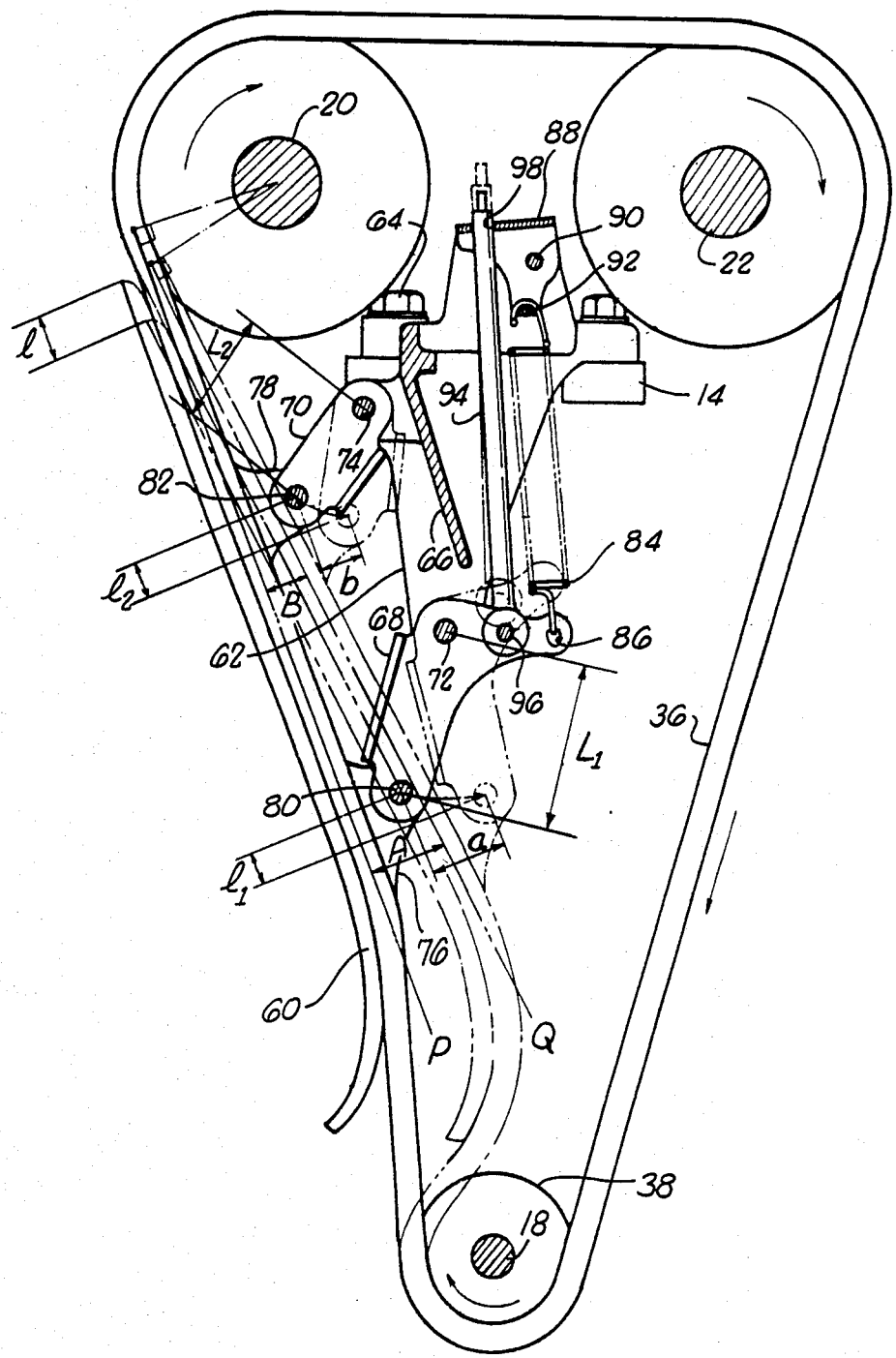
FIG. 2 is a more schematic end view of the timing chain of FIG. 1.
Figure 3:
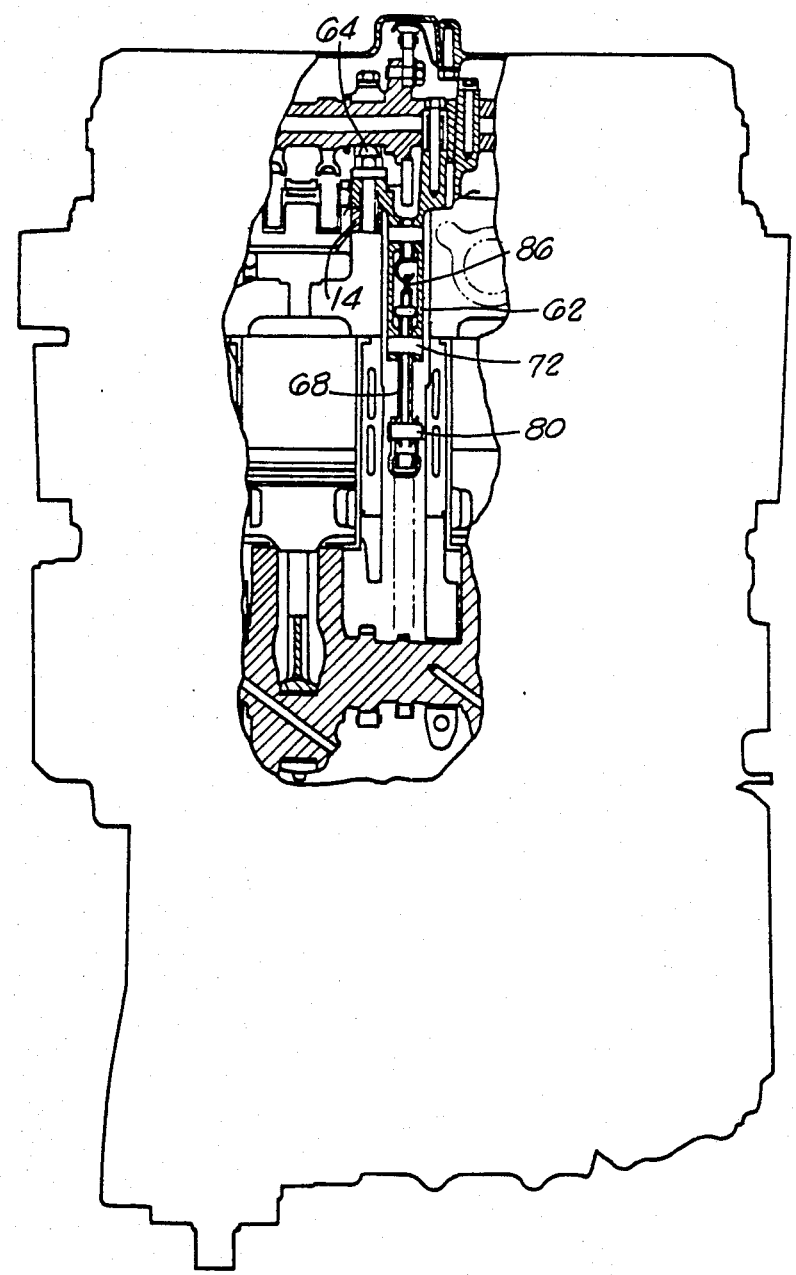
FIG. 3 is a cross-sectional side view taken along line III—III of FIG. 1.

The proportional extent of the first and second links in combinations with their location relative to the guide 60 describe a specific motion to the guide 60. This motion is best illustrated in FIG. 2 comparing the full line with the phantom line illustrations. As can be seen in that Figure, increased tensioning of the guide 60 causes the centerline P of the chain to move to the position Q. In doing so, the links 68 and 70 move as illustrated in phantom. The proportion of the lengths $l_1$ to $l_2$ of the links 68 and 70 results in this motion. As a result, the displacement A is greater than the displacement B. The displacement A is approximately equal to the displacement a and the displacement B is approximately equal to the displacement b of the pins 80 and 82, respectively. Additionally, lengths $l$, $l_1$ and $l_2$ are all approximately equal. Through this motion, the centerline of the chain as held by the guide 60 approaches the sprocket of the exhaust camshaft 20 at a tangent regardless of the position of the guide 60. The slackness in the chain is accommodated for by the opposite end of the guide 60, adjacent the camshaft 18. As a result, the cam chain 36 may be properly tensioned and constrained to run rapidly on the sprockets.

Thus, an improved chain tensioning mechanism is disclosed which is capable of being positioned substantially inside of the cam chain and properly tension and feed the chain about the sprockets. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A chain tensioner for an engine timing chain having a driving sprocket and a driven sprocket, comprising a guide positioned adjacent the slack side of the chain;

first and second links supporting said guide, said links being spaced apart, said first link being adjacent the driving sprocket and said second link being adjacent the driven sprocket;

a spring coupled with said first link to bias said guide at said first link against the chain; and said first and second links being of proportional extent such that the end of said guide adjacent the driven sprocket is tangent thereto.

2. The chain tensioner of claim 1 wherein said first and second links are pivotally mounted to the engine, said guide being pivotally mounted to each of said first and second links.

3. The chain tensioner of claim 1 wherein said first link is longer than said second link.

4. The chain tensioner of claim 1 wherein said links are inwardly of the timing chain, said guide including brackets extending about said timing chain to said links.

* * * * *